March 19, 1957 — A. SCHWARTZ ET AL — 2,786,004
THERMAL INSULATION
Filed Aug. 7, 1953 — 2 Sheets-Sheet 1

Inventors
Alexander Schwartz
Emile Fogelson
By Pennie, Edmonds, Morton, Barrows & Taylor
Attorneys March 19, 1957 A. SCHWARTZ ET AL 2,786,004
THERMAL INSULATION
Filed Aug. 7, 1953 2 Sheets-Sheet 2

Inventors
Alexander Schwartz
Emile Fogelson
By Pennie, Edmonds, Morton,
Barrows and Taylor
Attorneys

United States Patent Office 2,786,004
Patented Mar. 19, 1957

2,786,004

THERMAL INSULATION

Alexander Schwartz and Emile Fogelson, New York, N. Y., assignors to Leobarb Corporation, New York, N. Y., a corporation of New York Application August 7, 1953, Serial No. 372,882

8 Claims. (Cl. 154—45)

This invention relates to thermal insulation of general utility suitable for use in buildings, refrigerators, vehicles, boxes and the like, and has for its object the provision of an improved insulation of this character. More particularly, the invention is concerned with insulation in the form of thin sheets which may be supported in stretched positions across supporting or attaching members. The invention provides composite insulating products or structures formed of a plurality of sheets connected together and arranged to be installed as an integral structure.

The composite insulation of the invention comprises two or more sheets of insulating material such as metal foil, laminated foil and paper, asbestos, plastic, or paper, and may be formed entirely of one of these sheet materials or of combinations thereof. In accordance with our invention, we prefer to form the insulation of continuous sheets or webs of more or less indefinite length and to connect the lengthwise edge portions of the sheets together forming reenforced edge strips which provide a means for attaching the insulation to a supporting or framing structure.

The insulation of our invention comprises at least two sheets connected together along their longitudinal edges so as to form attachment edge strips and right-angle triangles extending the length of the insulation adjacent the attachment edge strips. When the insulation is installed by securing the attachment edge strips to the supporting or framing structures of a building or the like, the sheets assume stretched substantially flat positions parallel to each other at the desired space therebetween. In this position, the right-angle triangles extend along the framing structures, one of the sides thereof lying against the structure and the hypotenuses serving as braces holding the sides in contact with the inside of the framing structures and also holding at least one of the sheets in stretched spanning position.

In one of its aspects, the insulation is of the accordion pleated type that may be folded and compressed into relatively narrow strips for packaging and distribution and which can be expanded or stretched to its maximum width for installation between the framing structures. In accordance with this embodiment of the invention, the improved insulation is formed of at least three sheets of material in an accordion pleated construction. Two of these sheets, one called the "front sheet" and the other called the "back sheet" span the framing structures in a substantially flat spaced position and the third or intermediate sheet may also be flat or assume a zigzag position therebetween. The apex or crest of the first pleat along each edge of the intermediate sheet is attached, as with an adhesive, to the front sheet in such spaced relation that a right-angle triangle is formed along each edge, the 90° angle being alongside the framing structures, whereby the hypotenuses form braces holding the back sheet in close contact with the insides of the framing structures, thereby assuring the full effectiveness of the insulation with both the front and back sheets of foil in spaced relation over the full span between the framing structures.

The invention contemplates forming composite thermal insulation of any desired number of such pleated sheets; for example, a second sheet of zigzag material and an exterior sheet may be added to the aforementioned insulation, or a more complex insulation may be formed by combining two of the three member structures just described. The accordion pleated insulation can be folded and compressed into long narrow strips of indefinite length which can be cut into sections of any desired length or folded for packaging.

In another aspect of the invention, we form the composite insulation of two or more flat sheets that are connected together along their lengthwise edges with an interposed narrow edge sheet along each lengthwise edge to form the hypotenuses of right-angles triangles. In this form of our invention, the sheet called a front sheet has the interposed narrow edge sheet attached thereto serving as the hypotenuse and the back sheet is urged in its spanning position by the hypotenuse. This embodiment of composite insulation may comprise any desired number of sheets, each pair of adjacent sheets having a right-angle triangle therebetween extending along each lengthwise edge of the insulation. One important feature of this insulation is that there are no interposed members between the sheets (except the hypotenuses). This form of insulation can be folded along the edges into flat parallelism with the remaining portions of the sheets and then the flat composite sheet can be wound into a roll for packaging and distribution.

The insulation preferably comprises at least one sheet of aluminum foil or laminated paper and foil, and the other sheets of aluminum foil, paper or asbestos. In one form of insulation, consisting of but front and back sheets, such sheets are preferably formed of aluminum foil, but one sheet may also be formed of paper, and when an interposed or intermediate sheet is used, it may be formed of aluminum foil or paper. In another form of insulation consisting of five sheets, the front and back sheets may be formed of aluminum foil or paper, one of the intermediate sheets may be formed of paper or aluminum foil and the other sheets of aluminum foil or paper.

The insulation of the invention is a very effective insulating medium against the transmission of heat by conduction, convection, and radiation. When one or more of the sheets of insulation are formed of metal foil, such as aluminum foil, the insulation is a very effective barrier against the transmission of radiant heat. In providing an effective insulation against the transmission of radiant heat, we prefer to construct the insulation so that when it is installed between the framing members of a building, for example the wall studs, and the sheets are in stretched spanning position, they are supported or held in substantially parallel spaced position at least three-quarters of an inch apart.

These and other objects of the invention will be better understood after considering the following description taken in conjunction with the accompanying drawings, in which.

The thermal insulation illustrated in Figs. 1 to 4 comprises a front sheet 1, a back sheet 2, and an intermediate sheet 3 of any suitable sheet material. These sheets may be formed of aluminum foil, laminated paper and aluminum foil, plastic, asbestos, or paper. We prefer to form the front and back sheets of aluminum foil and the interposed sheet of paper.

In all embodiments of our invention when we use aluminum foil, the foil should be annealed dead soft aluminum varying, say, from 0.00025 to 0.006 inch in thickness. When paper is used, we prefer to use kraft paper of any suitable weight, say, from 18 pounds to 100 pounds base weight and preferably paper treated with fire, vermin and fungus retarding agents.

Figure 1:
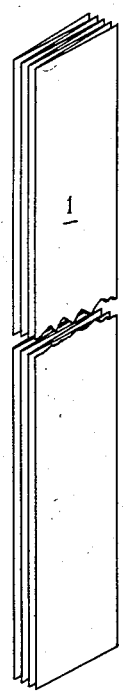
Fig. 1 is a perspective of one embodiment of insulation of the invention when in the form of a compressed strip.
Figure 2:
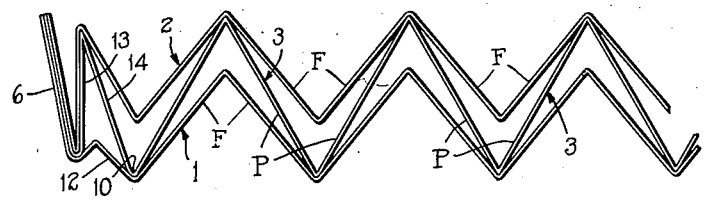
Fig. 2 is a sectional view of the insulation of Fig. 1 when partly expanded.

As best shown in Fig. 2, the three sheets have accordion-like pleats and are foldable and expansible together as a unit. The sheets may be pressed together into a narrow and thin strip as in Fig. 1 for packaging or pulled apart to the fully expanded position shown in Figs. 3 and 4 for installation.

It will be noted that when the insulation is attached to the framing structure, the interposed sheet 3, preferably of paper, assumes a zigzag form while the sheets 1 and 2, preferably of aluminum foil, are stretched taut. These relative positions are due to the fact that the individual pleats P of the paper are wider than the individual pleats F of the foil, as best shown in Fig. 2. We may vary the length of the pleats of sheet 3 and in that way cause the sheet to assume a spaced position without contacting sheets 1 and 2, as shown in Figs. 3, 4 and 5.

Figure 3:
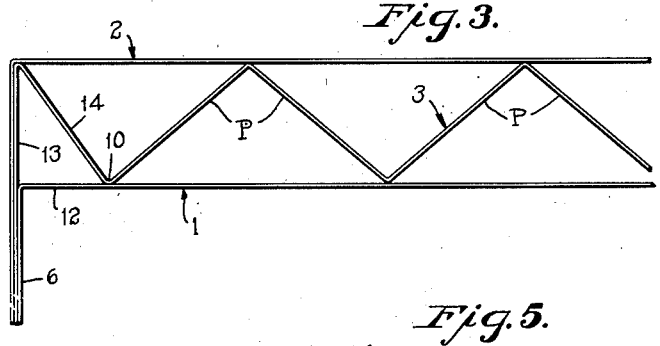
Fig. 3 is a sectional view of the insulation of Fig. 1 when fully expanded.
Figure 4:
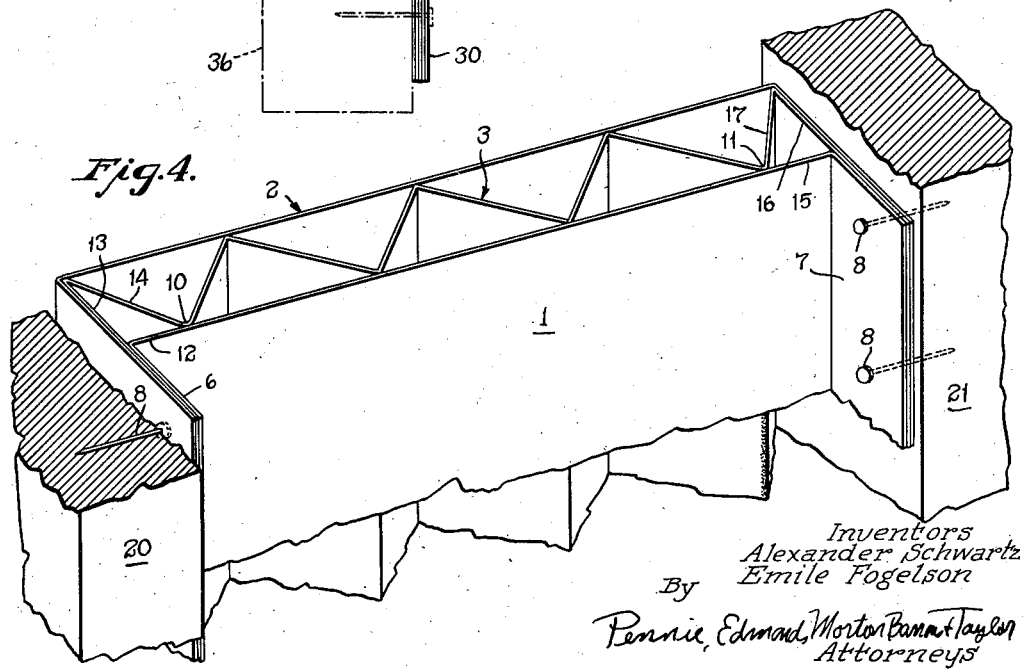
Fig. 4 is a perspective of the insulation of Figs. 1, 2 and 3 when installed between two framing structures.

The three sheets of material are permanently connected together along their longitudinal edges in any suitable manner, as by adhesive bonding, crimping, stitching, or stapling forming the attachment edge strips 6 and 7 for attaching the insulation to the framing structures with nails 8, as shown in Fig. 4, or with staples, adhesive or other means. When the insulation is initially formed into a strip, the attaching edge strips 6 and 7 are folded to the positions shown in Figs. 1 and 2, but when installed, they are swung about 180° to the position shown in Figs. 3 and 4.

With reference to Figs. 3 and 4, the first crest 10 at the left and the first crest 11 at the right of the zigzag sheet of paper 3 are each attached, as with an adhesive, to the front sheet of foil 1 in such spaced relation as to form the two right-angle triangles 12, 13, 14 and 15, 16, 17 extending the full length of the insulation. As shown in Figs. 3 and 4, the triangles comprise legs 12 and 13, and 15 and 16 respectively, and the hypotenuses 14 and 17 act as braces. When the foil is stretched between the framing structures 20 and 21, for example wall studs or roof rafters, and the attachment edge strips 6 and 7 are nailed to the inner faces, the hypotenuses of the right-angle triangles urge the legs of the triangles 13 and 16 into close contact with the inner faces of the framing structures, stretching the rear sheet of foil 2, and consequently the entire space is effectively insulated, and especially that area in close contact with each framing structure.

Figure 5:
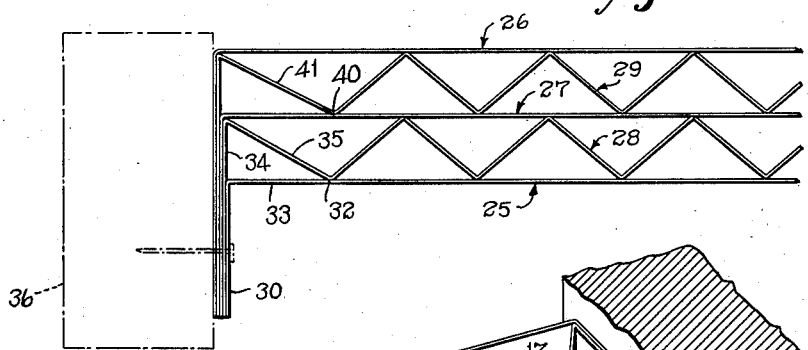
Fig. 5 is a sectional view of a modification of insulation of Fig. 1 illustrating its position when attached to a framing structure.

Fig. 5 illustrates a modification of our insulation of the accordion pleated type comprising a front sheet 25, a back sheet 26, a flat intermediate sheet 27 and two zigzag intermediate sheets 28 and 29. In this form of insulation, sheets 25, 26 and 27 are preferably formed of aluminum foil or laminated paper and foil and sheets 28 and 29 are preferably formed of kraft paper or asbestos. The five sheets are attached together along their longitudinal edges 30 in a manner similar to the insulation of Figs. 1–4. In this embodiment of the invention, the sheets 28 and 29 may be arranged to assume such zigzag positions as to aid in supporting the sheets of foil in spaced relation as shown, or they may be so proportioned as to be spaced from, and out of contact with, sheets 25, 26 and 27.

The first crest 32 of sheet 28 is attached as with adhesive to the sheet 25 so as to form the right-angle triangle having legs 33, 34 and hypotenuse 35, the hypotenuse 35 serving as a brace to hold the sheet of foil 27 taut by urging it in the direction of the framing structure 36.

The first crest 40 of sheet 29 is attached, as with adhesive, to the intermediate sheet of foil 27 forming another right-angle triangle with hypotenuse 41 acting as a bracing member which urges the rear layer of foil 26 into pressed or close contact with the structure 36.

Figure 6:
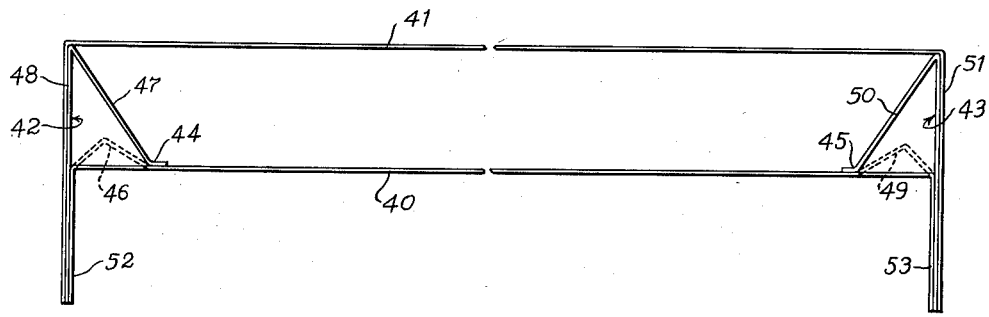
Fig. 6 is an end view of another form of insulation embodying the invention.

The insulation illustrated in Fig. 6 comprises a front sheet 40, a back sheet 41, and relatively narrow edge sheets 42 and 43. These sheets may be formed of any of the sheets of material previously described. Fig. 6 shows the insulation in the position it assumes when installed. The intermediate edge sheets 42 and 43 may be of stiffer material than sheets 40 and 41, such as sheets of heavy paper, and are attached, as with an adhesive, to sheet 40 at 44 and 45, respectively, in such spaced relation as to form the right-angle triangles 46, 47 and 48, and 49, 50 and 51. The hypotenuses 47 and 50 hold the sheet of foil 41 in its taut position and the legs of the triangles 48 and 51 in close contact with the framing structures to which they are attached. It is the stretching of sheet 40 that makes the hypotenuses 47 and 50 act as braces and stretch sheet 41. The overlying edge portions of sheets 40 and 41 and the interposed sheets 42 and 43 are connected together in any suitable way, as with an adhesive forming the attachment edge strips 52 and 53. The edge strips 52 and 53 have three layers of material and provide a relatively stiff and strong attaching means. The space between sheets 40 and 41 is preferably at least three-quarters of an inch.

Figure 8:
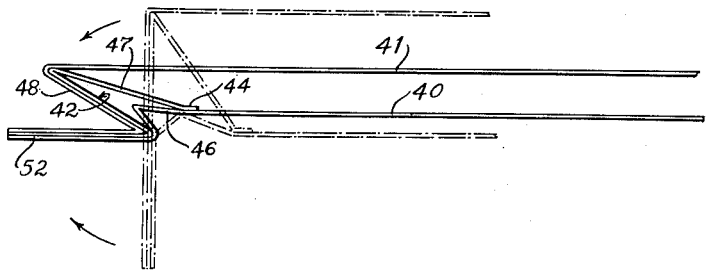
Fig. 8 is an end view of the insulation of Fig. 6 illustrating its folded flat position.

In folding the insulation to the flat position shown in Fig. 8, the legs 46 and 49 are folded inward, as shown in broken lines, Fig. 6, and then the edge strips are swung outwardly as shown in Fig. 8. The insulation is preferably formed of sheets of indefinite length and it may be cut into short lengths or it may be rolled up for packaging.

Figure 7:
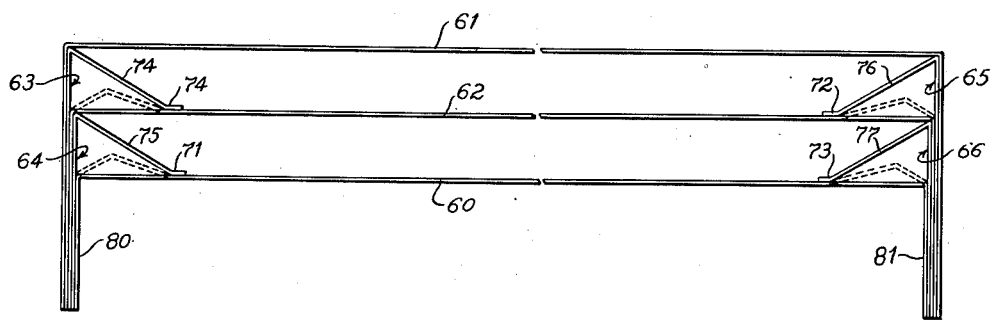
Fig. 7 is an end view of still another form of insulation embodying the invention.

Fig. 7 illustrates a variation of the insulation of Fig. 6 comprising front sheet 60, back sheet 61, intermediate sheet 62, and relatively narrow edge sheets 63, 64, 65 and 66. As described above, these sheets may be formed of any suitable material. Advantageously, however, in this embodiment of the invention, it is most effective to form at least sheets 60 and 61 of aluminum foil and to form sheets 63, 64, 65 and 66 of a stiffer material such as kraft paper of fairly heavy weight. Fig. 7 shows the insulation as in its installed position.

Sheets 63, 64, 65 and 66 are attached as with an adhesive at 71, 72, 73 and 74 to sheets 60 and 62 in such spaced relation as to form four right-angle triangles as in Fig. 6 having hypotenuses 74, 75, 76 and 77 which hold the sheets 61 and 62 in their taut spanning position shown and the opposite legs of the triangles in close contact with the framing structures. It is the stretching of sheet 60 that stretches sheet 62 that in turn stretches sheet 61.

The edge portions of sheets 60, 61 and 62 and sheets 63, 64, 65 and 66 are in overlying position and may be connected together in any suitable way as with an adhesive to form the attachment edges or strips 80 and 81. These reenforced edges are relatively strong and stiff and provide a good means for attaching the insulation to the framing structure as with nails, staples, adhesives, etc.

As shown in the broken lines, the portions of sheets 60 and 62 in the triangles are bent inwardly to fold the insulation into a flat position. In folding, the edges 80 and 81 are swung outwardly. This form of insulation may also be formed of sheets of indefinite length and then the composite insulation can be cut into any suitable lengths or wound into rolls for packaging.

It will be clear from the foregoing description and drawings that the improved insulation of the invention insures the maintenance of a uniform insulating medium over the entire span between the structural members.

In some forms of insulation of the invention, when aluminum foil is used for any of the sheets, the aluminum foil sheet or sheets may be attached along the attachment edge strips so as to minimize or eliminate the area of metal that will be in thermal conducting contact with the framing structure. This may be accomplished by using a suitable adhesive, a combination of adhesive with other attaching means, or with staples or the like.

We claim:

1. An improved thermal insulation which comprises at least two sheets of insulating material arranged in superposed position, one being a front sheet and the other a back sheet, sheet means interposed between edge portions of said sheets and connected thereto to form attachment edge strips for the insulation extending the length thereof, said sheet means being attached lengthwise of the sheets in such spaced relation as to form with the front sheet a right-angle triangle extending lengthwise along each edge portion of the insulation the hypotenuse of which is formed of the sheet means, said right angle triangles being so constructed and arranged that when said attachment edge strips are attached to the inner parallel faces of two adjacent framing structures and in flat parallel connection thereto, one leg of each triangle lies parallel to the framing structure, another leg of each triangle extends at right angles to the first-mentioned leg and is part of the front sheet, the hypotenuse of each triangle extending from the front sheet to the back sheet and serving as a brace to push the back sheet into near contact with the framing structures and to hold it in stretched spanning position between the structures.

2. Thermal insulation according to claim 1 in which the front and back sheets are formed of aluminum foil.

3. Thermal insulation according to claim 1 in which the sheet means are relatively narrow with respect to the front and back sheets and are formed of relatively stiffer material.

4. Thermal insulation according to claim 1 in which the triangles and the attachment edge strips can be folded into overlying parallelism with the front and back sheets and the insulation wound into a roll.

5. An improved thermal insulation for installation between framing structures which comprises at least three sheets of insulating material arranged in superposed position, one being a front sheet, one an intermediate sheet and the other a back sheet, sheet means interposed between the front sheet and the intermediate sheet and between the intermediate sheet and the back sheet, at least along the edge portions thereof, said sheets and sheet means being connected together along their edge portions forming attachment edge strips for the insulation extending the length thereof, said sheet means being also attached lengthwise to the front and intermediate sheets in such spaced relation as to form four right-angle triangles one along each edge portion of the insulation between the front and intermediate sheets and one along each edge portion of the insulation between the intermediate and back sheets, two of the right angle triangles formed between the front sheet and the intermediate sheet each having one of its legs lying parallel to the inner face of a framing structure when attached thereto and its other leg formed of the front sheet and extending at right angles to the framing structure and the other leg, and the hypotenuse being formed of the sheet means, the hypotenuse serving as a brace to push the intermediate sheet into close contact with the framing structure and to hold it in stretched spanning position between the framing structures, and the two right angle triangles formed between the intermediate sheet and the back sheet each having one of its legs lying parallel to the framing structure when attached thereto and its other leg formed of the intermediate sheet and extending at right angles to the framing structure and the other leg, and the hypotenuse being formed of the sheet means between the intermediate sheet and the back sheet and serving as a brace to push the back sheet into near contact with the framing structure and to hold it is stretched spanning position between the framing structures.

6. Thermal insulation according to claim 5 in which the front and back sheets are formed of aluminum foil.

7. Thermal insulation according to claim 5 in which the sheet means are formed of relatively stiff material with respect to the front and back sheets.

8. An improved thermal insulation which comprises at least two sheets of insulating material arranged in superposed position, one being a front sheet and the other a back sheet, sheet means interposed between edge portions of said sheets and connected thereto to form attachment edge strips for the insulation extending the length thereof, said sheet means being attached lengthwise of the sheets in such spaced relation as to form with the front sheet a right-angle triangle extending lengthwise along each edge portion of the insulation the hypotenuse of which is formed of the sheet means, said attachment edge strips extending from the front sheet providing means for attachment to the inner opposite faces of adjacent framing structures, said attachment edge strips when attached to the framing structures being substantially at right angles to the front and back sheets each right angle triangle having one leg lying parallel to the framing structure when attached thereto and another leg extending at right angles from the other leg and the framing structure and being part of the front sheet, the hypotenuse of each right angle triangle serves as a brace urging the back sheet into a stretched taut position and unattached parts of the edge strips into approximate contact with the framing structure.

References Cited in the file of this patent
UNITED STATES PATENTS

| | | |
|---|---|---|
| 2,101,836 | Benedict | Dec. 14, 1937 |
| 2,251,585 | Finck | Aug. 5, 1941 |
| 2,312,301 | Turner et al. | Mar. 2, 1943 |